United States Patent [19]

Emery et al.

[11] Patent Number: 4,602,872

[45] Date of Patent: Jul. 29, 1986

[54] TEMPERATURE MONITORING SYSTEM FOR AN ELECTRIC GENERATOR

[75] Inventors: Franklin T. Emery, Orlando; William G. Craig, Casselberry; Franklin J. Murphy, Oviedo, all of Fla.

[73] Assignee: Westinghouse Electric Corp., Pittsburgh, Pa.

[21] Appl. No.: 698,488

[22] Filed: Feb. 5, 1985

[51] Int. Cl.$^4$ .......................................... G01K 13/00
[52] U.S. Cl. ..................... 374/152; 310/53; 310/68 C; 374/115; 374/169; 340/870.17; 364/557
[58] Field of Search ............... 310/53, 54, 57, 58, 310/59, 60 R, 60 A, 68 C, 260; 374/115, 152, 169, 170; 340/870.17, 870.04, 870.05; 364/557, 571, 734

[56] References Cited

U.S. PATENT DOCUMENTS

| 2,934,655 | 4/1960 | Heller | 310/53 |
| 2,975,308 | 3/1961 | Kilbourne | 310/53 |
| 3,822,389 | 7/1974 | Kudlacik | 310/53 |
| 3,894,138 | 7/1975 | Klaar | 310/53 |
| 3,955,359 | 5/1976 | Yannone | 364/557 |
| 4,190,829 | 2/1980 | Schmitt et al. | 310/53 |

FOREIGN PATENT DOCUMENTS

| 1156161 | 10/1963 | Fed. Rep. of Germany | 310/53 |
| 2158456 | 5/1973 | Fed. Rep. of Germany | 310/53 |
| 0048011 | 11/1980 | Japan | 374/115 |
| 2133562 | 7/1984 | United Kingdom | 374/169 |
| 1103094 | 7/1984 | U.S.S.R. | 374/154 |

Primary Examiner—R. Skudy
Attorney, Agent, or Firm—D. Schron

[57] ABSTRACT

A generator having stator windings which are water cooled includes a plurality of sensors each for measuring the temperature of cooling water as it is discharged from respective sections of the stator windings and prior to its collection in a common manifold. The outputs of the sensors are combined to obtain an average reading and during an initialization process, each sensor reading is subtracted from the average to derive a correction factor for that particular sensor, for that particular average. The generator is operated so that other averages are selected for the calculation of other sensor correction factors. When operating on line, the correction factors are utilized to obtain a value for a percent of average coil temperature in accordance with the relationship:

$$\% \text{ OF AVG. COIL TEMP} = \frac{T + CF}{\text{AVG.}} * 100$$

where T is the temperature indication provided by the sensor, AVG is the average of all of the sensor readings, and CF is the appropriate correction factor for that sensor for that average.

8 Claims, 7 Drawing Figures

INITIALIZATION

TEMPERATURE MONITORING SYSTEM FOR AN ELECTRIC GENERATOR

BACKGROUND OF THE INVENTION

1. Field of the Invention

The invention in general relates to a temperature monitoring system for an electric generator and particularly to a generator having water cooled stator coils.

2. Description of the Prior Art

In electric generators such as those driven by steam turbines, a tremendous amount of heat is produced during normal operation. Some generators may weigh hundreds of tons and the unchecked production of heat in such machines as caused by mechanical and $I^2R$ losses would quickly lead to a complete generator failure.

Accordingly, the heat dissipation requirement for a generator is accomplished with a cooling system which utilizes a flow of cooling gas within the generator housing as well as within the rotor and stator structures to remove the produced heat. Some generator designs additionally flow the cooling gas through the stator coils themselves while in another design a cooling liquid such as water is passed through the stator coils for cooling purposes. In the water cooled system, water is piped into a circumferential manifold at one end of the generator and flows into the stator coil ends by means of tubing. The water discharges from the stator coil at the opposite end where it is collected by tubes feeding into a discharge manifold from which the water is processed and cooled for recirculation. During passage through the stator coil, the water functions to absorb generated heat.

A plurality of temperature sensors are provided for the continuous monitoring of the cooling water to protect the generator against failure. A rise in temperature of the cooling water may be indicative of such problems as a broken conductor or a coolant water flow reduction due to a partial blockage of the coolant path.

The generator stator core, made up of a plurality of thin laminations, has equally spaced slots running the entire length of the core. Each slot is deep enough to accommodate two separately wound coil sections and the water discharge from each coil section is monitored by a respective temperature sensor such as a thermocouple to obtain a temperature indicative reading.

A common method for monitoring the thermocouples consists of forming two separate groups, the top coils in the slot constituting one group and the bottom coils of the slots constituting a second group. The high to low temperature difference between temperature sensor readings in each of the two groups is calculated separately and if the temperature spread between the highest and lowest reading is above a certain value, a warning indication is provided to the operator and in response to which the generator may be removed from service.

For a 48 slot stator, there would be 96 stator coil temperature sensors. Periodic recordation by hand of 96 sensor readings and a calculation of a high-low difference is an extremely time consuming and laborious task. Accordingly, more advanced systems include means for periodically scanning the temperature sensors and placing the readings into the storage of a microcomputer which calculates the high-low difference. Since all temperature sensors are not identical, nor identically placed, a large temperature difference between the high and low readings may exist even under normal operating conditions and especially at high generator load levels. In addition, as will be subsequently explained, a temperature sensor during a malfunction may provide an abnormally high reading from its previous normal reading, however, such condition will go undetected utilizing the high-low difference method between coil groups.

The present invention provides for an improved temperature monitoring system for such generator wherein early detection of an abnormally hot stator coil is made possible independent of the effects of variations in inlet water temperature, water flow rate and generator load conditions.

SUMMARY OF THE INVENTION

In the temerature monitoring system of the present invention, a plurality of temperature sensors are positioned, as in the prior art arrangement, to derive respective signals indicative of the temperature of cooling liquid discharged from the generator stator winding sections. As opposed to the prior art arrangement, the signals from all of the sensors are combined to derive an average which may be varied by varying generator operating conditions.

Initially a plurality of correction factors are generated and stored for each sensor output for each of a plurality of different average temperature values, where the correction factor for each sensor is equivalent to the difference between the average value and the particular sensor value. During normal on-line operation of the generator, the sensor signals are periodically sampled to derive average temperature indications for the sampling periods. Means are provided and is responsive to the average temperature indication derived during a sampling period as well as to the stored correction factors to derive, for each of the sensor outputs, an appropriate correction factor which may be equal to the stored correction factor for that sensor at that average temperature condition, or a modified correction factor based upon an interpolation between two stored readings. A relative temperature indicative value for each sensor is then generated by adding the appropriately derived correction factor to the current sensor reading and dividing by the derived average temperature indication. The resulting value may be multiplied by 100 thereby yielding a percentage indication which is displayed for operator use. Each of the generated percentage indications may be compared with first and second alarm limits to appropriately notify the operator should either of the alarm limits be exceeded.

DESCRIPTION OF THE PREFERRED EMBODIMENT

Figure 1:
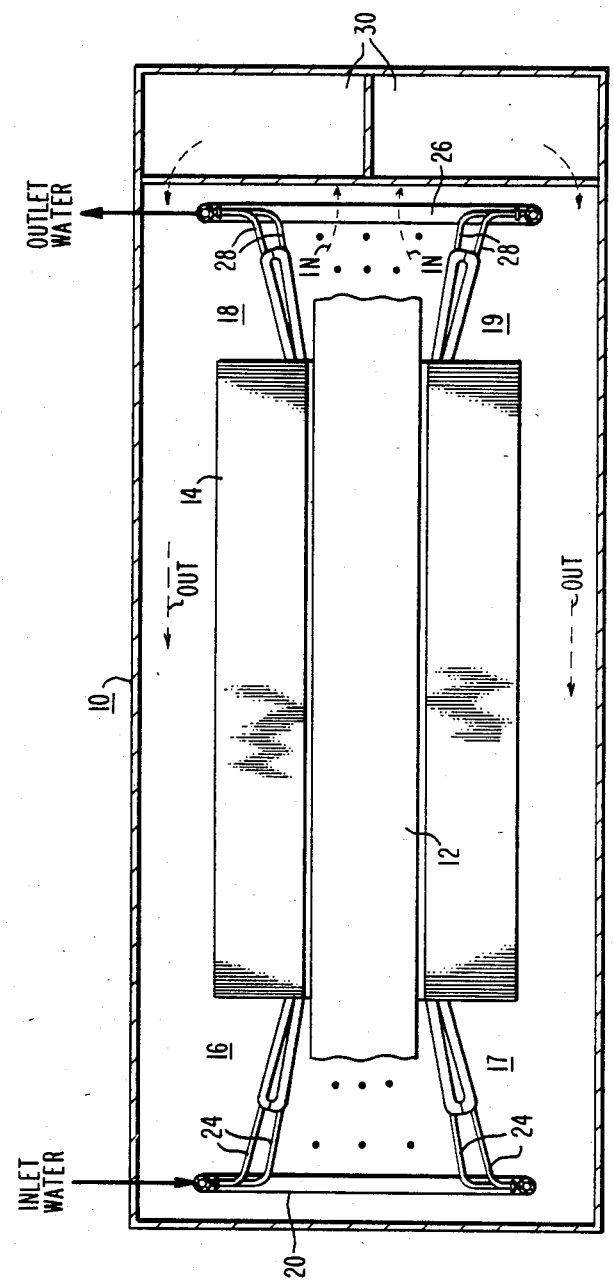
FIG. 1 is a simplified sectional view of an electric generator.

Generator 10 of FIG. 1 includes a rotor 12 (a portion of which is illustrated) surrounded by a stator 14 having a plurality of slots for receiving the stator windings, or coils. For simplicity, only four coil portions 16 to 19 are illustrated. The sections extend out of the stator core with each of the portions being comprised of a bottom half coil positioned in the bottom of one stator slot and connected to a top half coil positioned in the top a different one of such slots. Inlet cooling water is supplied to an inlet manifold 20 which distributes the water to the half coil sections by means of tubes 24. After passage through the respective coil sections, the water is provided, via respective tubes 28, to a discharge manifold 26 from which the water is processed and cooled for recirculation.

The generator is additionally cooled by means of gas flow, such as hydrogen, indicated by the dotted arrows emanating from, and returning to, heat exchangers 30. The cooling gas is also supplied to apertures within the rotor and stator core for additional cooling.

Figure 2:
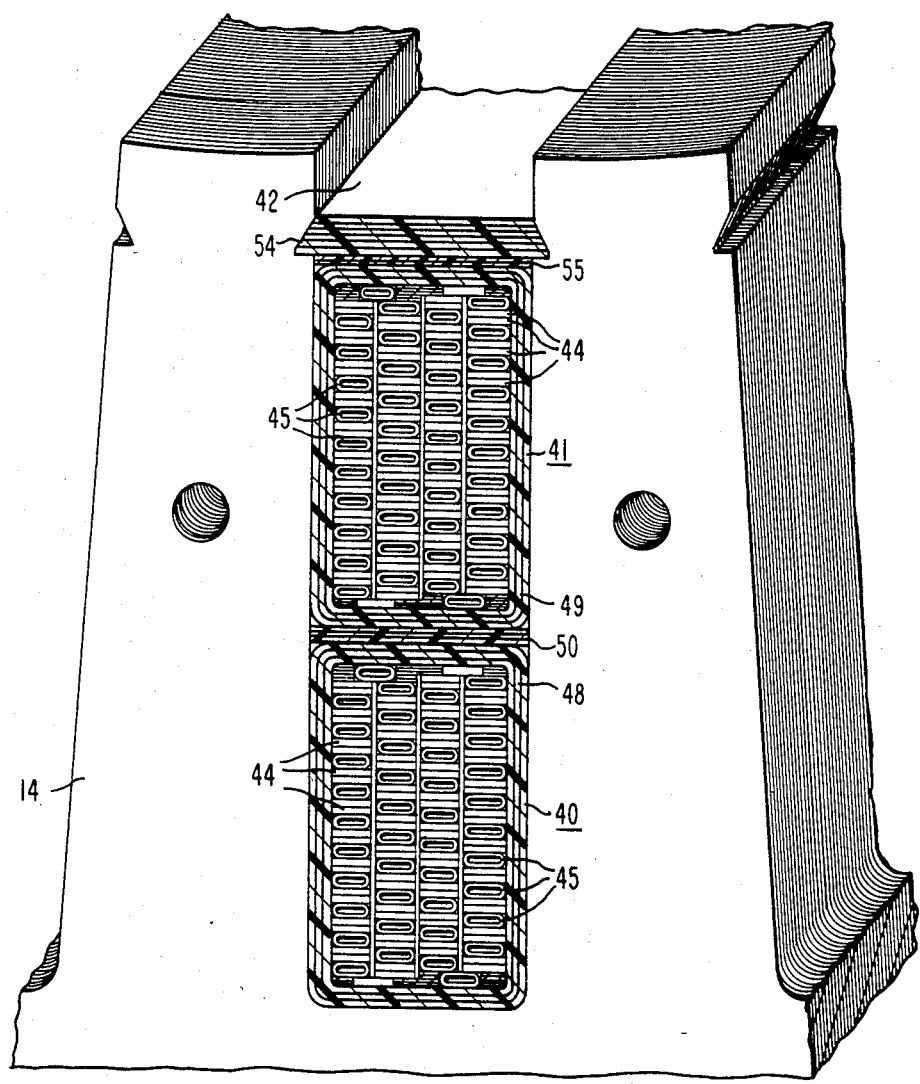
FIG. 2 is a sectional view illustrating two half coils arranged in a slot of the stator of the generator.

FIG. 2 illustrates two coil sections, a bottom half coil 40 and a top half coil 41 positioned within a slot 42 of the stator core 14. Each of the coils includes a plurality of insulated electrical conductors called strands, some of which are solid as indicated by numeral 44 and others of which are hollow as indicated by numeral 45, with the hollow strands being utilized for conduction of the cooling water throughout the length of the stator core.

The strands of each half coil are additionally surrounded by respective insulating layers 48 and 49 separated by spacing member 50 with the windings being held in position by means of a wedge 54 and ripple spring 55.

Figure 3:
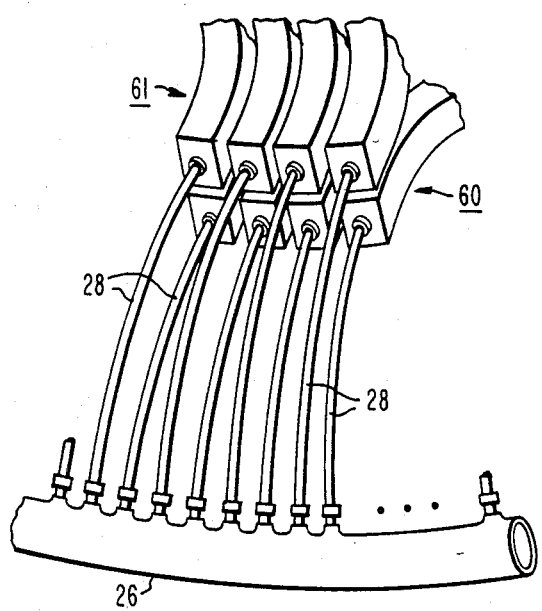
FIG. 3 is a view of cooling water connections between a manifold and the stator coil sections.

FIG. 3 illustrates the ends of a plurality of bottom half coils 60 and a plurality of top half coils 61 each being of the type illustrated in FIG. 2. Water flowing through the hollow strands of the coils accumulates in headers at the very end of the coil and from which the water is conducted to the discharge manifold 26 via the discharge tubes 28. It is to be noted that the discharge manifold 26 in actuality extends 360° around the interior of the generator and although 8 half coils are illustrated, a typical generator may have 48 slots for a total of 96 half coils.

Figure 4:
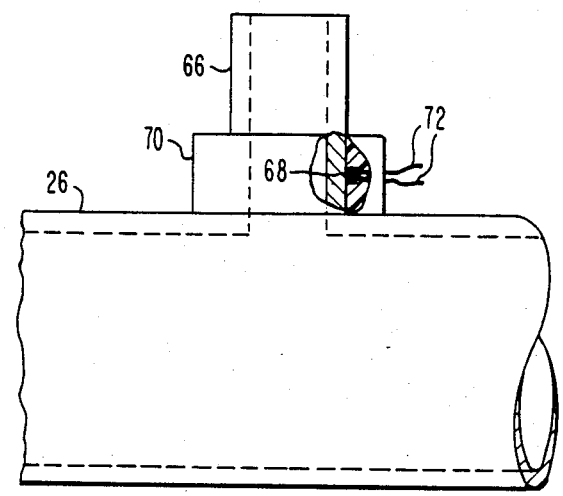
FIG. 4 illustrates the mounting of a temperature sensor.

In the present invention, as well as in the prior art, temperature sensors are provided to obtain an indication of the temperature of the water discharged in tubes 28, with one temperature sensor being provided for each discharge tube. One way of obtaining this temperature indication is illustrated in FIG. 4, which shows a portion of the discharge manifold 26 having a nipple portion 66 secured thereto and to which a discharge tube 28 would be connected. A temperature sensor such as a thermocouple 68 is placed on the nipple 66 and is surrounded by an insulator 70. Thermocouple leads 72 along with the leads from the other 95 thermocouples are electrically brought to a location outside of the generator where the thermocouple voltages may be read.

An example of the prior art monitoring operation is depicted in the following Table 1 and, for simplicity, ten temperatures sensors $S_1$ to $S_{10}$ are utilized instead of 96.

TABLE 1

| (1) TEMPERATURE SENSOR # | (2) BEFORE MALFUNCTION TEMP. (°C.) | | (3) DURING MALFUNCTION TEMP. (°C.) | |
|---|---|---|---|---|
| $S_1$ | 36.2 | HIGH | 36.2 | HIGH |
| $S_2$ | 35.3 | ↑ | 35.3 | } $\Delta T = 5°$ C. |
| $S_3$ | 31.1 | } $\Delta T = 6°$ C. | 31.1 | LOW |
| $S_4$ | 35.2 | ↓ | 35.2 | |
| $S_5$ | 30.2 | LOW | 35.4 | $\Delta T\ S_5 = 5.2°$ C. |
| $S_6$ | 32.1 | | 32.1 | |
| $S_7$ | 34.4 | | 34.4 | |
| $S_8$ | 33.3 | | 33.3 | |
| $S_9$ | 33.4 | | 33.4 | |
| $S_{10}$ | 35.5 | | 35.5 | |

Column 2 gives typical sensor readings prior to a malfunction and in accordance with the prior art operation, the difference between the highest and lowest temperature indications is obtained to see that it does not exceed a preset threshold. In the example of Table 1, sensor $S_1$ is providing the high reading of 36.2° C. while sensor $S_5$ is providing the low reading of 30.2° C. resulting in a difference $\Delta T$ of 6° C. and below an alarm limit of, for example, 8° C.

Column 3 shows sensor readings during a malfunction such as a coil blockage. As a result of the malfunction, sensor $S_5$ which previously yielded a low value of 30.2° C. now has jumped 5.2° C. to a new value of 35.4° C., an abnormal condition. With this change in reading, sensor $S_3$ now provides the low value of 31.1 yielding a temperature difference of 5° C. between it and the high of 36.2° C. Accordingly, a malfunction has occurred resulting in an abnormal jump in temperature of one of the sensor readings. However, in accordance with the prior art process, the difference between the high and low readings is not only less than the alarm limit, but is even less than the difference prior to the malfunction such that the occurrence of the malfunction is not detected. The temperature monitoring system of the present invention will detect an abnormal rise in one or more of the temperature sensors so that an alarm condition may be conveyed to the operator for corrective action.

In accordance with one aspect of the present invention, a plurality of temperature sensors are provided as in the prior art, each for obtaining an indication of the temperature of the discharge water in a respective one of the discharge tubes leading to the discharge manifold. Circuit means are provided for scanning the sensors and obtaining an average temperature reading. Each sensor reading is compared with the average during an initialization process to derive a correction factor, CF, which is equal to the average temperature indications of all of the sensors, AVG, minus an individual sensor temperature indication, T, as set forth in equation (1)

$$CF = AVG - T \quad (1)$$

Therefore, if there are n sensors, n correction factors are generated for that particular average temperature.

The operating conditions of the generator system are varied, such as by increasing load, to obtain another initial average temperature value for which correction factors for all of the sensors are derived. The process is continued such that a series of initial average temperatures are selected and a correction factor is calculated for each sensor for each such selected initial average temperature. Progressively greater initial average temperatures may be obtained, for example, by progressively increasing the generator load level during a time period when the turbine which derives the generator is coming on line. For a certain constant load level, the initial average temperature may be varied by varying other parameters such as cooling water flow rate through the coils or inlet coling water temperature. Thus, the initialization process establishes a correction factor for each individual sensor for each of a plurality of different average temperatures. For n sensors and m initial average temperature selections, n×m correction factors would be generated and placed into storage for subsequent use in on-line monitoring.

During the on-line temperature monitoring, a relative temperature indicative value, R, is obtained for each sensor and based on the relationship:

$$R = \frac{T + CF}{AVG.}$$

where T is the particular sensor temperature indication, CF is the correction factor and AVG is the current average for that on-line condition. For convenience of comparison this value may be multiplied by 100 to obtain a value for percentage of average coil temperature as set forth equation 2.

$$\% \text{ OF AVG. COIL TEMP} = \frac{T + CF}{AVG.} * 100 \quad (2)$$

If, during the on-line monitoring, the average temperature should happen to equal a previously selected initial average temperature, plus or minus some deviation, $\delta°$ C., then the stored correction factors associated with that initial average temperature may be utilized in equation 2. If the current average temperature does not meet these criteria, then a correction factor may be generated by a simple interpolation process.

Table 2 below illustrates an initialization procedure.

TABLE 2

| (1) TEMPERATURE SENSOR # | (2) TEMP (°C.) | (3) CORRECTION FACTOR (°C.) | (4) CORRECTED VALUE (°C.) | (5) PCT. OF AVE. COIL TEMP (%) |
|---|---|---|---|---|
| $S_1$ | 36.2 | −2.5 | 33.7 | 100 |
| $S_2$ | 35.3 | −1.6 | 33.7 | 100 |
| $S_3$ | 31.1 | +2.6 | 33.7 | 100 |
| $S_4$ | 35.2 | −1.5 | 33.7 | 100 |
| $S_5$ | 30.2 | +3.5 | 33.7 | 100 |
| $S_6$ | 32.1 | +1.6 | 33.7 | 100 |
| $S_7$ | 34.4 | −.7 | 33.7 | 100 |
| $S_8$ | 33.3 | +.4 | 33.7 | 100 |
| $S_9$ | 33.4 | +.3 | 33.7 | 100 |
| $S_{10}$ | 35.5 | −1.8 | 33.7 | 100 |
| AVG | 33.7 | | | |

In order to compare with the prior art high-low method, column 2 of Table 2 includes the exact temperatures for the ten sensors as presented in the prior art example of Table 1. The average temperature of all ten readings is 33.7° C. In accordance with equation 1, a correction factor for each sensor reading is calculated, with the correction factors being presented in column 3. Thus, during the initialization, if the correction factor is added to the actual temperature a corrected value equal to the average value is obtained, and if divided by the average temperature and multiplied by 100 in accordance with equation 2, will yield a percentage of average coil temperature=100 for each sensor, as indicated in column 5.

In the following Table 3, the first three columns reproduce columns 1, 2 and 5 of Table 2 and represent a normal condition prior to a malfunction; columns 4 and 5 represent values during a malfunction.

TABLE 3

| (1) TEMPERATURE SENSOR # | (2) BEFORE MALFUNCTION TEMP. (°C.) | (3) BEFORE MALFUNCTION PCT. OF AVE. COIL TEMP (%) | (4) DURING MALFUNCTION TEMP. (°C.) | (5) DURING MALFUNCTION PCT. OF AVE. COIL TEMP. (%) |
|---|---|---|---|---|
| $S_1$ | 36.2 | 100.0 | 36.2 | 98.5 |
| $S_2$ | 35.3 | 100.0 | 35.3 | 98.5 |
| $S_3$ | 31.1 | 100.0 | 31.1 | 98.5 |
| $S_4$ | 35.2 | 100.0 | 35.2 | 98.5 |
| $S_5$ | 30.2 | 100.0 | 35.4 | 113.7 |
| $S_6$ | 32.1 | 100.0 | 32.1 | 98.5 |
| $S_7$ | 34.4 | 100.0 | 34.4 | 98.5 |
| $S_8$ | 33.3 | 100.0 | 33.3 | 98.5 |
| $S_9$ | 33.4 | 100.0 | 33.4 | 98.5 |
| $S_{10}$ | 35.5 | 100.0 | 35.5 | 98.5 |
| AVG | 33.7 | | AVG 34.2 | |

In accordance with the present example, during the malfunction sensor $S_5$ provides an output reading indicative of a 5.2° C. increase. This increase changes the average value from 33.7° C. to 34.2° C., a rise of 0.5° C. Let it be assumed that 0.5° is less than the deviation $\delta°$ such that the correction factors calculated for the initial 33.7° average may be utilized. In such case, the correction factors of column 3 of Table 2 may be utilized along with the current average of 34.2° and the actual temperatures in column 4 of Table 3 to compute, in accordance with equation 2, a percentage of average coil temperature as indicated in column 5 of Table 3. The 5.2° C. rise provided by sensor $S_5$ has the effect of reducing the percentage of average coil temperature values for the remaining sensors from 100% to 98.5% whereas the value for sensor $S_5$ has increased from 100% to 113.7% thus, clearly identifying the sensor and accordingly the malfunctioning half coil with which it is associated.

Although 10 sensors are illustrated by way of example, an actual generator installation may have 48 slots thereby requiring 96 sensors, in which case the 5.2° C. increase in one sensor would change the average very slightly such that the percentage of average coil temperature for the remaining sensors would be closer to the 100% value.

Figure 5A:
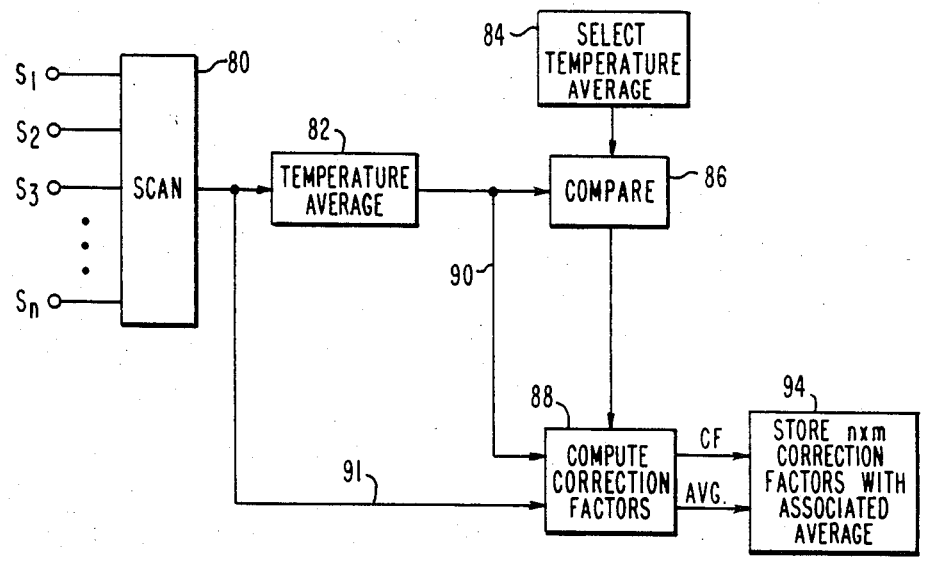
FIGS. 5A and 5B are block diagrams serving to illustrate an embodiment of the present invention.

FIG. 5A is a block diagram serving to illustrate the initialization process of the present invention. Scanning unit 80 is operable to scan n temperature sensors $S_1$ to $S_n$ and provide their output signals to averaging circuit 82 operable to obtain a single temperature value which is the average of all the sensor outputs. By means of selection circuit 84 an operator may select a plurality of different temperature averages for computation of sensor correction factors. A first temperature average is selected and the generator operated, such as by adjusting load, so that the average temperature as determined by circuit 82 is equivalent to the selected temperature average as determined by circuit 84. When the two are equal, as determined by comparison circuit 86, computation circuit 88 is then enabled to compute, in response to the average signal on line 90 and individual sensor signals on line 91, n different correction factors in accordance with equation (1) for the first selected temperature average. The results of the computation, as well as the average, is placed into storage 94 for subsequent use.

The operatr may then select a subsequent temperature average and the process repeated for that selection. During the initialization process, the operator will select m different temperature average such that n×m correction factors are stored along with their associated average from which they were computed.

If the resolution of a temperature sensor is, for example, 0.1° C., then the temperature average may be selected to increase in 1/10° increments with n correction factors computed for each increment. Such operation would require a tremendous amount of storage and as a practical matter is unnecessary. By use of simple interpolation techniques, the number of temperature averages selected may be greatly reduced. By way of example, a typical temperature average during operation may range from 0° C. to 70° C. and this range may be divided into ten equal increments (m=10) such that a new temperature average is selected every 7° C. This value is given merely by way of example it being understood that a greater or lesser number of increments may be selected without jeopardizing the ability of the apparatus to identify a malfunctioning coil.

Figure 5B:
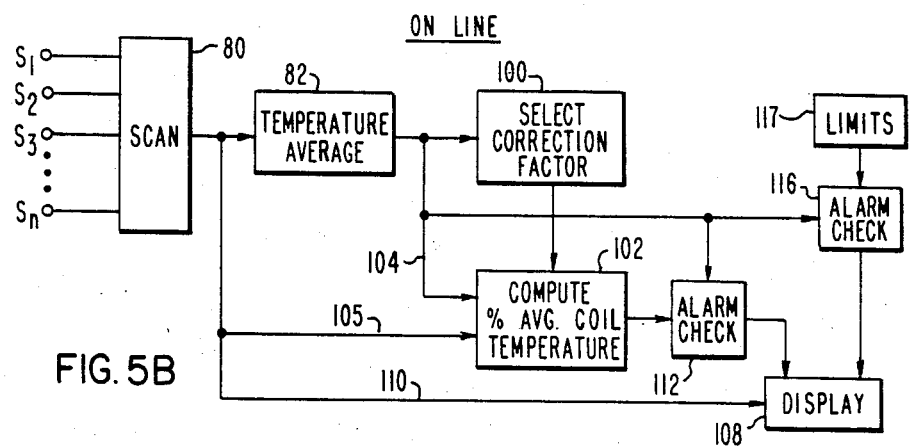

FIG. 5B is a block diagram illustrating the on-line operation of the present invention after initialization and storage of all the correction factors. During operation, scanning unit 80 provides the outputs of all the sensors to the temperature averaging circuit 82. A temperature average is thus established for a particular on-line condition. Selection circuit 100 is responsive to the average provided by circuit 82 and is operable to select the appropriate correction factor for each sensor output as it is scanned. If the temperature average happens to be equal to one of those selected during the initialization process, then the correction factors associated with such average are utilized to compute the percent of average coil temperature in circuit 102 which additionally receives the average value on line 104 and the individual sensor values on line 105.

If the temperature average is within a predetermined range of one of those selected during the initialization process, then the same correction factors may be utilized. If the average temperature is outside of the predetermined range, then circuit 100 is operable to compute a correction factor based upon well-known interpolation techniques as illustrated in FIG. 6 to which reference is now made.

Figure 6:
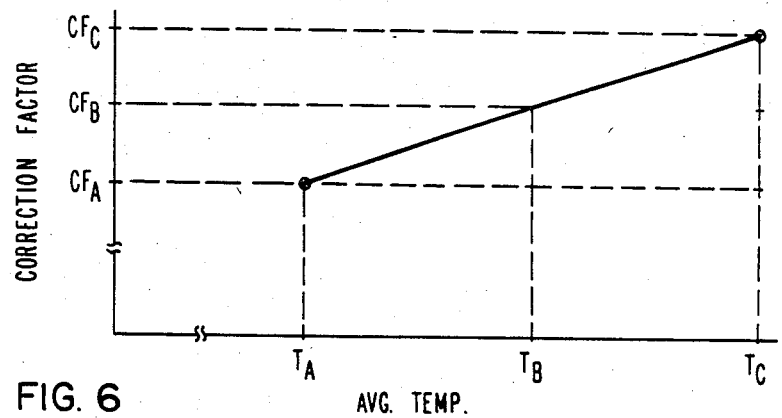
FIG. 6 is a curve generated and utilized in the operation depicted in FIG. 5B.

In FIG. 6 average temperature is plotted on the horizontal scale and correction factor on the vertical scale. Temperatures $T_A$ and $T_C$ represent two temperature averages selected during the initialization process for which correction factors were computed and FIG. 6 represents the correction factor values for one sensor. At average temperature $T_A$ the correction factor for the sensor is $CF_A$ and at average temperature $T_C$, the correction factor for the sensor is $CF_C$. Let it be assumed that during operation the average temperature is $T_B$, somewhere between $T_A$ and $T_C$ and outside of the range for which $CF_A$ and $CF_C$ may be utilized. The unknown correction factor for temperature $T_B$ is $CF_B$. From the relationship of similar triangles, it may be shown that:

$$CF_B = \frac{(T_C - T_A)CF_C - (T_C - T_B)(CF_C - CF_A)}{T_C - T_A} \quad (3)$$

Returning once again to FIG. 5B, selection circuit 100 therefore is operable to provide the proper correction factor for each sensor reading based upon a previously stored value or a value calculated in accordance with equation 3 for which all of the terms on the right-hand side of the equation are known.

Display apparatus 108 is provided in order to present the individual temperature sensor signals via line 110, if desired, as well as the results of the computation of percent of average coil temperature performed by circuit 102. Prior to display, these values may be checked to see that they do not exceed predetermined values. For this purpose, an alarm check circuit 112 is provided and is operable to compare each value provided by circuit 102 with a first or warning alarm limit, as well as with a second or shut down alarm limit. If either of these limits are attained, such indication may be displayed such as by flashing the particular value or by a change in color, if the display apparatus includes a color monitor. The maximum and minimum warning alarm limits may be calculated in accordance with equations 4 and 5 while the maximum and minimum shutdown alarm limit may be calculated in accordance with equations 6 and 7.

$$\text{WARNING ALARM LIMIT (MAX)} = \frac{\text{AVG. TEMP} + X}{\text{AVG. TEMP}} * 100 \quad (4)$$

$$\text{WARNING ALARM LIMIT (MIN)} = \frac{\text{AVG. TEMP} - X}{\text{AVG. TEMP}} * 100 \quad (5)$$

$$\text{SHUTDOWN ALARM LIMIT (MAX)} = \frac{\text{AVG. TEMP} + Y}{\text{AVG. TEMP}} * 100 \quad (6)$$

$$\text{SHUTDOWN ALARM LIMIT (MIN)} = \frac{\text{AVG. TEMP} - Y}{\text{AVG. TEMP}} * 100 \quad (7)$$

By way of example, typical alarm limit values for X and Y may be:

X=3.0° C.
Y=6.0° C.

The temperature average calculated by circuit 82 may also be provided to display apparatus 110 after an alarm check by circuit 116 to see that the temperature average for a particular load, cooling flow rate, and inlet water temperature condition is within predetermined limits as indicated by limit input 117.

Although the operations illustrated in FIGS. 5A and 5B have been separated into functional blocks, it is to be understood that the initialization and on-line monitoring could be performed with a digital computer in which case conventional analog-to-digital conversion circuitry would be provided.

We claim:

1. Temperature monitoring apparatus for an electric generator having stator windings divided into sections through which a cooling liquid is passed and discharged to a common manifold, comprising:
   (A) a plurality of temperature sensors operable to provide output signals indicative of the temperature of discharged cooling liquid from respective ones of said sections;

(B) means for combining all of said temperature sensor output signals for deriving an average temperature indication which may be varied by varying generator operating conditions;

(C) means for initially generating and storing a correction factor for each said sensor output signal when said average temperature indication has a first predetermined value and a respective plurality of other correction factors when said average temperature indication has respective other predetermined values;

(D) means for periodically sampling and temperature sensor output signals during on-line operation of said generator and deriving respective average temperature indications;

(E) means response to (i) said average temperature indication derived during a sampling period and (ii) said stored correction factors to derive, for each said sensor output, an appropriate correction factor;

(F) means for generating, as a result of said sampling, a relative temperature indicative value, for each said sensor output signal, based on the relationship $$R = \frac{T + CF}{AVG.}$$

where R is said reative temperature indicative value, T is the temperature indication for a particular sensor CF is said appropriate correction factor for said particular sensor and AVG is said average temperature indication for said sampling period; and (G) means for displaying the respective relative temperature indicative values of said sensors.

2. Apparatus according to claim 1, wherein:

(A) the relative temperature indicative value generated is the percentage of average coil temperature $$= \frac{T + CF}{AVG.} * 100$$

3. Apparatus according to claim 2, wherein:

(A) the individual temperature sensor output signals are additionally displayed on said means for displaying.

4. Apparatus according to claim 1, wherein:

(A) said appropriate correction factor for a particular on-line average temperature indication is the same as the correction factor stored for an initial average temperature indication if said on-line average temperature indication is within a predetermined range, $\pm \delta°$, of said initial average temperature indication.

5. Apparatus according to claim 1, wherein:

(A) said appropriate correction factor is an interpolated value based on the relationship $$CF_B = \frac{(T_C - T_A)CF_C - (T_C - T_B)(CF_C - CF_A)}{T_C - T_A}$$

where $T_A$ and $T_C$ are two initial average temperature indications, $CF_A$ and $CF_C$ are the respective correction factors stored for $T_A$ and $T_C$, $T_B$ is the on-line average temperature indication and $CF_B$ is the appropriate correction factor for $T_B$.

6. Apparatus according to claim 2, which includes:

(A) means for comparing each said percentage of average coil temperature with a plurality of predetermined alarm limits based upon average temperature.

7. Apparatus according to claim 6, wherein said plurality of predetermined alarm limits includes:

(A) maximum and minimum warning alarm limits.

8. Apparatus according to claim 6, wherein said plurality of predetermined alarm limits includes:

(A) maximum and minimum shutdown alarm limits.

* * * * *